(12) United States Patent
Alford et al.

(10) Patent No.: US 7,629,028 B2
(45) Date of Patent: *Dec. 8, 2009

(54) METHODS OF MAKING MONOLAYERS

(75) Inventors: Kentin L. Alford, Pasco, WA (US); Kevin L. Simmons, Kennewick, WA (US); William D. Samuels, Richland, WA (US); Thomas S. Zemanian, Richland, WA (US); Jun Liu, Albuquerque, NM (US); Yongsoon Shin, Richland, WA (US); Glen E. Fryxell, Kennewick, WA (US)

(73) Assignee: Battelle Memorial Insitute, Richland, WA (US)

( * ) Notice: Subject to any disclaimer, the term of this patent is extended or adjusted under 35 U.S.C. 154(b) by 586 days.

This patent is subject to a terminal disclaimer.

(21) Appl. No.: 10/607,870

(22) Filed: Jun. 27, 2003

(65) Prior Publication Data
US 2004/0001943 A1 Jan. 1, 2004

Related U.S. Application Data

(60) Continuation-in-part of application No. 10/346,866, filed on Jan. 17, 2003, now Pat. No. 6,753,038, which is a division of application No. 09/528,345, filed on Mar. 17, 2000, now Pat. No. 6,531,224, which is a continuation-in-part of application No. 09/272,762, filed on Mar. 19, 1999, now abandoned.

(51) Int. Cl.
*B05D 3/04* (2006.01)
(52) U.S. Cl. ............... 427/287; 427/299; 427/377; 427/387; 427/389.7

(58) Field of Classification Search .......... 427/240, 427/256, 287, 443.2, 299, 337, 377, 387, 427/389.7
See application file for complete search history.

(56) References Cited

U.S. PATENT DOCUMENTS

| 4,539,061 A | 9/1985 | Sagiv |
|---|---|---|
| 5,264,203 A | 11/1993 | Beck et al. |
| 5,380,585 A | 1/1995 | Ogawa et al. |

(Continued)

FOREIGN PATENT DOCUMENTS

| JP | 05279011 | 10/1993 |
|---|---|---|
| WO | WO 98/34723 | 8/1998 |

OTHER PUBLICATIONS

Cao, C. et al., "Formation of Trialkyl Silyl Monolayers in SI(100) Using Organosilanes in Carbon Dioxide", 1999, p. 841.

(Continued)

*Primary Examiner*—Kirsten C Jolley
(74) *Attorney, Agent, or Firm*—Wells St. John P.S.

(57) ABSTRACT

The invention pertains to methods of forming monolayers on various surfaces. The surfaces can be selected from a wide array of materials, including, for example, aluminum dioxide, silicon dioxide, carbon and SiC. The substrates can be planar or porous. The monolayer is formed under enhanced pressure conditions. The monolayer contains functionalized molecules, and accordingly functionalizes a surface of the substrate. The properties of the functionalized substrate can enhance the substrate's applicability for numerous purposes including, for example, utilization in extracting contaminants, or incorporation into a polymeric matrix.

6 Claims, 6 Drawing Sheets

U.S. PATENT DOCUMENTS

| | | | |
|---|---|---|---|
| 5,403,665 | A | 4/1995 | Alley et al. |
| 5,669,303 | A * | 9/1997 | Maracas et al. ............. 101/327 |
| 5,725,987 | A * | 3/1998 | Combes et al. ........ 430/137.11 |
| 6,039,821 | A * | 3/2000 | Buck ......................... 156/62.2 |
| 6,183,815 | B1 * | 2/2001 | Enick et al. ................. 427/400 |
| 6,326,326 | B1 | 12/2001 | Feng et al. |
| 6,344,243 | B1 | 2/2002 | McClain et al. |
| 6,716,378 | B2 * | 4/2004 | Yang et al. .................... 264/42 |
| 6,733,835 | B2 * | 5/2004 | Fryxell et al. ............... 427/299 |
| 6,753,038 | B2 * | 6/2004 | Fryxell et al. ............... 427/337 |
| 2002/0127399 | A1 * | 9/2002 | Mankell et al. ............. 428/375 |
| 2002/0197879 | A1 * | 12/2002 | Fukushima et al. ......... 438/758 |
| 2003/0083516 | A1 | 5/2003 | Korth et al. |
| 2004/0034154 | A1 * | 2/2004 | Tutin et al. ................. 524/538 |

OTHER PUBLICATIONS

Feng, X. et al., "Functionalized Monolayers on Ordered Mesoporous Supports", Science vol. 276, May 9, 1997, pp. 923-926.

Liu, J. et al., "Hybrid Mesoporous Materials with Functionalized Monolayers", Adv. Mater., 10, No. 2, 1998, pp. 161-165.

Combes, J. et al., "Chemical Modification of Metal Oxide Surfaces in Supercritical $CO_2$: In Situ Infrared Studies of the Adsorption and Reaction of Organosilanes on Silica", Langmuir vol. 15, No. 22 (1999), pp. 7870-7875.

Shin, Y. et al., "Supercritical Processing of Functionalized Size Selective Microporous Materials", Microporous and Mesoporous Materials 37, (2000), pp. 49-56.

Zemanian, T. et al. "Deposition of Self-Assembled Monolayers in Mesoporous Silica from Supercritical Fluids", Langmuir, 2001, vol. 17, pp. 8172-8177.

* cited by examiner

METHODS OF MAKING MONOLAYERS

RELATED PATENT DATA

This patent resulted from a continuation-in-part of U.S. patent application Ser. No. 10/346,866, filed Jan. 17, 2003, now U.S. Pat. No. 6,753,038; which is a divisional of U.S. patent application Ser. No. 09/528,345, filed Mar. 17, 2000, now U.S. Pat. No. 6,531,224; which is a continuation-in-part of U.S. patent application Ser. No. 09/272,762, filed Mar. 19, 1999, now abandoned.

GOVERNMENT RIGHTS

This invention was made with Government support under Contract DE-AC0676RLO1830 awarded by the U.S. Department of Energy. The Government has certain rights in the invention.

TECHNICAL FIELD

The present invention pertains to methods of making monolayers, and in particular aspects pertains to methods suitable for forming monolayers of functionalized silicon over a diversity of substrates.

BACKGROUND OF THE INVENTION

It is frequently desired to form a functionalized monolayer over a substrate surface. FIGS. 1 and 2 describe a general scheme by which a functionalized monolayer can be formed over a surface. Referring initially to FIG. 1, a precursor 10 suitable for utilization in forming a monolayer is illustrated. Precursor 10 comprises an attaching group 12 which ultimately is utilized for forming an attachment to the substrate surface. The attachment between attaching group 12 and the surface can comprise a covalent bond. Accordingly, attaching group 12 of precursor 10 can comprise suitable leaving groups which are displaced when attaching group 12 interacts with atoms associated with the surface so that bonds are formed to connect the attaching group to the surface.

Attaching group 12 is connected to a linker 14, which extends to a functional group 16. Linker 14 (which can also be referred to as a spacer) can be a hydrocarbon chain, and is shown comprising 5 carbon atoms. The length of spacer 14 can be varied depending on a desired distance between functional group 16 and attachment group 12.

Functional group 16 comprises a desired functionality. For instance, if a monolayer is ultimately to be utilized for extracting mercury or other heavy metals, functional group 16 can comprise thiols as described in Feng, X.; Fryxell, G. E.; Wang, L. Q.; Kim, A. Y.; Liu, J.; Kemner, K. Science, 1997, 276, 923-926(Feng et al, 1997).

Referring to FIG. 2, a substrate 18 is provided, and a surface 20 of the substrate is exposed to a plurality of the precursors 10 (only some of which are labeled). The precursors bind to upper surface 20 through attachment group 12 to form a monolayer 22 over surface 20. Such monolayer is effectively a coating over surface 20, and an outer periphery of such coating corresponds to functional groups 16. The monolayer 22 can be referred to as a monolayer of functionalized material formed over substrate surface 20, and the process of forming monolayer 22 over the substrate of surface 20 can be referred to as functionalizing of the surface.

Several applications are known in which it is desired to form a functionalized monolayer over a substrate surface. Such applications include functionalizing surfaces of porous materials (for example, mesoporous ceramics and zeolites), and non-porous materials. However, there remains a need to develop improved methodologies for functionalizing substrate surfaces.

With respect to the mesoporous materials, significant efforts have been made to develop methodologies suitable for functionalizing surfaces of the materials, and particular efforts have been made to find methodologies suitable for functionalizing surface regions extending within pores of the mesoporous materials. Since their unveiling in 1992, mesoporous ceramics have inspired substantial interest, especially by adding self-assembling monolayer compounds to the surface(s) of the mesopores. By varying the terminal group of the self-assembling monolayers, various chemically functionalized materials have been prepared. A mesoporous material is defined as a material, usually a catalytic material, having pores with a diameter or width range of 2 nanometers to 0.05 micrometers.

Exemplary methods of forming and using self-assembling monolayer(s) on mesoporous materials are described in the International Application Publication WO 98/34723. The self-assembling monolayer(s) are made up of a plurality of assembly molecules each having an attaching group. For attaching to silica, the attaching group may include a silicon atom with as many as four attachment sites, for example; siloxanes, silazanes, and chlorosilanes. Alternative attaching groups include metal phosphate, hydroxamic acid, carboxylate, thiol, amine and combinations thereof for attaching to a metal oxide; thiol, amine, and combinations thereof for attaching to a metal; and chlorosilane for attaching to a polymer. A carbon chain spacer or linker extends from the attaching group and has a functional group attached to the end opposite the attaching group, as described in FIGS. 1 and 2.

Methods of attaching and constructing a self-assembling monolayer on a mesoporous material can involve solution deposition chemistry in the presence of water. More specifically, as reported in Feng et al, 1997; and Liu, J.; Feng, X.; Fryxell, G. E.; Wang, L. Q.; Kim, A. Y.; Gong, M. Adv. Mat. 1998, 10, 161-165 (Liu et al., 1998), a synthetic protocol to prepare monolayers of MPTMS (mercaptopropyl trimethoxysilane) within the pores of MCM-41 can involve a 1-hour hydration step, followed by a 6-hour silanation step in refluxing toluene. At this stage, the silane coverage is limited to approximately 3.6-4.0 silane molecules/nm$^2$ (this surface density is not enhanced by either extending the reaction time or increasing silane concentration). Following the silanation with a 2-3 hour azeotropic distillation drives the equilibria through the removal of reaction by-products, and increases this surface density to 5.0-5.2 silanes/nm$^2$. This surface density is representative of typical silane-based monolayers. The monolayer coated mesoporous product is then isolated by filtration, washed extensively and dried for several days. The overall procedure typically takes about 10 hours of laboratory preparation time and 1-10 days of drying time. The reaction time is driven by the kinetics of getting the self-assembling molecules into the mesopores, and getting the water and any other solvent out of the mesopores.

The product obtained exhibits a maximum of 40% of the monolayer silicon atoms fully crosslinked for maximizing monolayer stability. Ideally, 100% of the silicon atoms would be fully crosslinked. Full crosslinking is having three of the four bonding sites linked to another silicon atom via an oxygen atom, with the fourth linked to the functional group terminated linker (typically a hydrocarbon chain). The crosslinking can be impeded by the presence of "dangling" hydroxyl groups. Such hydroxyl groups represent a defect in the crosslinking of the monolayer, and thus place a practical upper limit on the number of silicon atoms that are fully crosslinked.

Thermal curing of silane monolayers can be utilized to increase crosslinking. Typical thermal curing (ca. 150° C.) of a silane monolayer creates a terminal to internal silane ratio of 1:2, corresponding to about 60% to 65% of attaching molecules (silicon) being fully crosslinked.

It is desirable to develop methods of forming self-assembling monolayers in which a high fraction of the assembly atoms are fully crosslinked. It is desirable for the methods to be applicable for a diverse range of substrates, including mesoporous materials. It is desirable to have a high surface density of monolayer coverage. It is also desirable to develop methods of forming the monolayers that are rapid and economical.

It can be difficult to adequately diffuse monolayer precursors (typically organic molecules) into the small pore channels of mesoporous materials during functionalizing of the mesoporous materials. In the last few years, both post-silanization and in-situ deposition have been successfully applied to mesoporous materials, in which the pore diameter is usually larger than 2 nm. The mesoporous materials (usually synthesized using surfactant micelles as templates) have very uniform pore sizes. Because of their high surface area and the open pore channels; functionalized mesoporous materials have been investigated for many adsorption and catalysis applications. However, due to the large pore size and the amorphous nature of the materials, these materials appear unlikely to find application as size selective catalysts.

A zeolite is any one of a family of hydrous aluminum silicate minerals whose molecules enclose cations of sodium, potassium, calcium, strontium, or barium, or a corresponding synthetic compound. Zeolites are typically used as molecular filters and ion-exchange agents. Compared to the mesoporous materials, the diffusion of organic molecules in zeolites is severely hindered by the small pore size. Deposition of silanes on the exterior surface is therefore greatly favored over silanation of internal surfaces. Heretofore, it had been believed that introducing organic functional groups to the internal pore surfaces of commercial zeolites to produce size selective microporous catalysts could not be achieved due to the size of the pores.

SUMMARY OF THE INVENTION

The invention includes methods of forming functionalized monolayers across substrate surfaces at enhanced pressures. The monolayers can be self-assembled monolayers, and the pressure is preferably greater than the corresponding saturation pressure for deposition of the self-assembled monolayers. In particular aspects, the pressure can be at least about 2 atmospheres (about 30 psi), in further aspects at least about 100 psi, at least about 1,000 psi, at least about 4,000 psi, and even at least about 8,000 psi. The functionalized monolayer can be formed by providing a suitable precursor in a reaction chamber with a substrate while exposing the precursor and substrate to the enhanced pressure. The precursor can be within a suitable fluid during the exposure to the pressure. In particular applications, the fluid can be in the form of a gas, in other applications the fluid can be in the form of a liquid, and in particular applications the fluid can be in the form of a supercritical fluid.

The substrate can be a mesoporous material, a zeolite, or any of a diverse number of other substrates. The other substrates can include, for example, substrates having a carbon-comprising surface, such as, for example, carbon black, carbon fibers, or silicon carbide materials. The substrates can additionally, or alternatively, be materials comprising oxygen-containing surfaces, such as, for example, substrates containing aluminum oxide surfaces, silicon dioxide surfaces, titanium oxide surfaces, etc.

In one aspect of the present invention, a functional material having a self-assembled monolayer on a substrate is formed to have a plurality of assembly molecules each with an assembly atom with a plurality of bonding sites. A bonding fraction (or fraction) of fully bonded assembly atoms (fully crosslinked assembly atoms, with an exemplary assembly atom being Si) with the plurality of bonding sites (for example, the plurality of bonding sites bonded to an oxygen atom for SI—O materials) can be enhanced, and the maximum surface density of assembly molecules can be enhanced. For example, with the assembly atom silicon, having 4 bonding sites, the bonding fraction maximum for some prior art methods was 40% as deposited or about 60% to 65% (a terminal to internal silane ratio of about 1:2) after thermal curing, and maximum surface density of silane molecules was 5.2 silanes per square nanometer. Note that crosslinking fraction and surface density are separate parameters.

The present invention includes improvements to the known methods for making a self-assembled monolayer on a substrate. In particular aspects, the improvements include an increased pressure during formation of the monolayer. The increased pressure can be accompanied by supercritical phase chemistry in some aspects of the invention. The monolayers can comprise any of a number of core assembly atoms, with silicon being a typical core assembly atom.

The present invention can provide the advantages of greater fraction of bridging oxygen bonds, and greater surface density of assembly molecules, resulting in a lower defect coating that enhances thermal and chemical stability or resistance. Further, hydrolysis and deposition can be complete within 5 minutes (or even substantially faster), a surprising rate enhancement of more than two orders of magnitude. Also, if a supercritical fluid is utilized as a reaction medium, a final drying phase can be eliminated. The product can emerge from the reaction chamber dry and ready to use, which can provide a considerable savings in time.

Water can be an important reactant in the hydrolysis and condensation chemistry of alkylsilanes to form self-assembled monolayers on ceramic oxide surfaces. It should be present in appropriate (stoichiometric) amounts; too little will result in incomplete deposition and crosslinking and too much will result in bulk solution phase polymer formation. Experience has shown that approximately $10^{19}$ water molecules per square meter of available surface area can be optimum. This amounts to approximately 2 water molecules for each silane to be anchored.

The water is preferably intimately associated with the surface of a substrate, rather than free in solution. By having the water in close proximity to the substrate surface, the silane hydrolysis/condensation chemistry can take place primarily (and preferably only) on the surface, thereby favoring the desired monolayer deposition and avoiding solution phase polymerization (which can lead to bulk amorphous polymer and blocked pores). This association of water with the surface of a substrate can be important in obtaining thin film morphology, and in obtaining clean monolayer formation.

The water associated with the surface should be evenly spread across the surface. This can allow the hydrolysis chemistry to take place in intimate contact with the surface; which can reduce monolayer defect formation while at the same time minimizing bulk polymerization.

In particular applications, water is added to a surface prior to exposure of the surface to a monolayer-forming precursor. The water can be allowed to fully equilibrate with the surface, and such can enable one to exploit the natural affinity that particular surfaces have for water.

Adding water separately to a solution of silanes can result in bulk solution phase polymerization competing with any possible monolayer deposition. This is counter-productive, since it can significantly deplete the amount of silane available to form the monolayer. Further, in the case of a mesoporous substrate, the bulk amorphous polymer can plug and block the pore channels, reducing the available surface area and restricting interfacial access, and can thus eliminate desirable features of the porous materials.

A potential difficulty associated with monolayer formation is that a waste stream can be produced. For instance, a prior art process produced a mixture of water, methanol, toluene and small amounts of mercaptan that failed to be deposited. It can be difficult to separate the hazardous materials from the waste stream mixture. If a fluid comprising $CO_2$ is utilized as a carrier of precursor (with the term "fluid" encompassing liquids, gases and supercritical fluids), it is possible for the only by-product of the reaction (hydrolysis) to be an alcohol (e.g. methanol), which is easily separated from the $CO_2$ (which can be recovered for recycling). In fact, the alcohol may be of sufficient purity to represent a potential feedstock that can be sold or recycled. A further advantage of using $CO_2$ as fluid carrier of precursor is the reduction or elimination of flammable solvents. This can simplify scale-up.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

Figure 1:
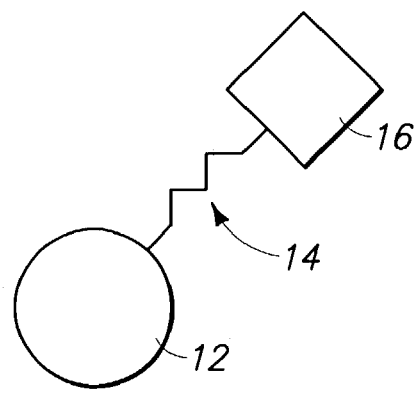
FIG. 1 is a diagrammatic view of a prior art precursor molecule that can be utilized in forming a monolayer of functionalized material.
Figure 2:
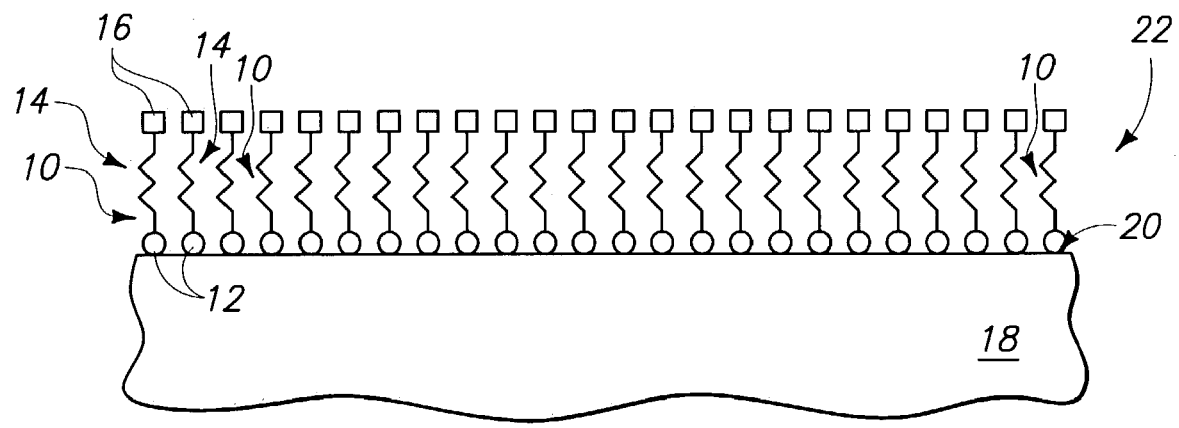
FIG. 2 is a diagrammatic, cross-sectional view of a prior art assembly comprising a monolayer of functionalized material on a substrate surface.

This disclosure of the invention is submitted in furtherance of the constitutional purposes of the U.S. Patent Laws "to promote the progress of science and useful arts" (Article 1, Section 8).

The invention encompasses methods by which monolayers of functionalized material can be formed on a substrate surface. The substrate can be chosen from a diverse group of materials, including, for example, mesoporous materials, zeolites, materials having oxygen exposed at the surface (such as, for example, materials comprising aluminum oxide, silicon dioxide, and/or titanium oxide at the surface), and materials comprising carbon at the surface (such as, for example, carbon black, carbon fibers, and structures with silicon carbide surfaces). In particular aspects, the functionalized monolayer is formed by placing a suitable precursor in a reaction chamber with a substrate, and exposing the precursor and substrate to a pressure substantially in excess of atmospheric pressure. The pressure within the chamber can be, for example, at least 30 psi, at least 100 psi, at least 1,000 psi, at least 4,000 psi, and in particular applications at least 8,000 psi.

The precursor can be within a fluid carrier stream in the chamber. The fluid can be in the form of a liquid, gas or supercritical fluid, depending on the chemical composition of the carrier and the pressure within the chamber. An exemplary carrier is $CO_2$, and other carriers include, for example, ammonia, hydrocarbons, aromatic compounds, etc.

It has been found that the pressure within the chamber can significantly affect the rate at which a monolayer is formed over a substrate, and can also affect the quality of the monolayer (e.g., the uniformity with which the layer is provided, the total amount of crosslinking within the layer, and the extent to which the layer penetrates pores in a mesoporous material or a zeolite). It is found that higher pressures lead to better-quality monolayers, with a minimal acceptable pressure typically being at least about 2 atmospheres. Significant improvements are frequently observed if the pressure exceeds 4,000 psi, and measurable improvements can occur at a pressure in excess of about 8,000 psi relative to a pressure of about 4,000 psi.

The improvements observed under increased pressure are frequently independent of the state of the fluid. For instance, the improvement observed under conditions in which a precursor is within a supercritical fluid are oftentimes approximately comparable to the results observed when the precursor is in a non-supercritical fluid at a comparable pressure. In other words, if a comparison is conducted between two different conditions for monolayer formation, with the conditions being identical to one another in all respects except for the fluid utilized so that one of the conditions occurs under a supercritical fluid and the other occurs under a non-supercritical fluid, the rate of monolayer formation and the quality of the resulting functionalized monolayer are found to be frequently very comparable between the two sets of conditions. Further, if the conditions are changed relative to one another so that one is conducted at a higher pressure than the other, it will typically be found that the higher pressure conditions yield a better monolayer than the lower pressure conditions, regardless of the which set of conditions has the supercritical fluid.

Figure 3:
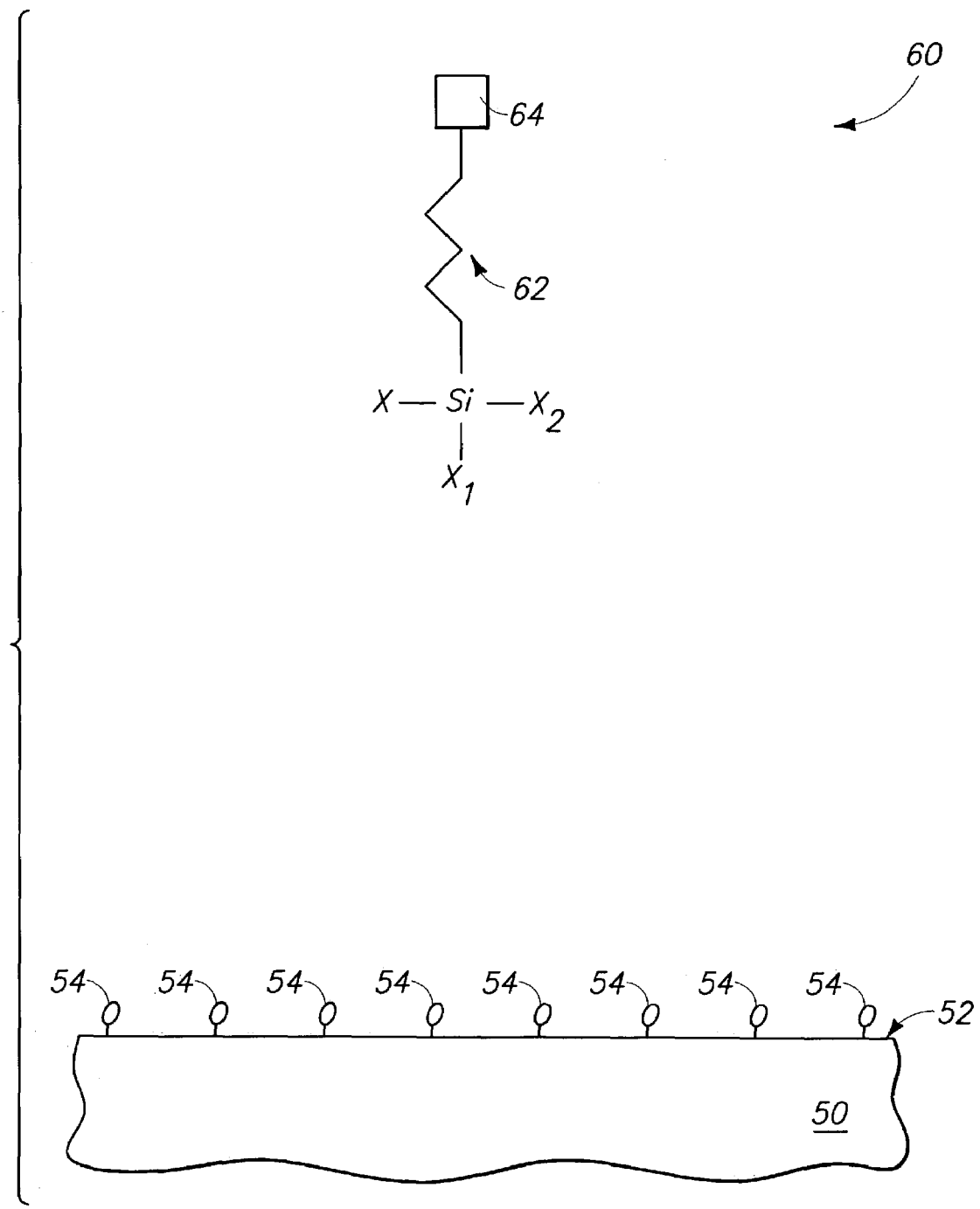
FIG. 3 is a diagrammatic view of a precursor molecule and substrate at a preliminary processing stage of an exemplary method of the present invention for forming a monolayer of functionalized silicon on a substrate surface. The substrate surface is shown comprising oxygen atoms associated therewith.

An exemplary aspect of the invention is described with reference to FIGS. 3 and 4. Referring initially to FIG. 3, a substrate 50 is provided proximate a precursor 60. The substrate and precursor can be together provided within a suitable reaction chamber.

Substrate 50 comprises a surface 52 having oxygen atoms 54 associated therewith. The oxygen atoms are shown simply as "O"s sticking upwardly from the substrate, which can be negatively charged oxygen atoms extending from the substrate surface. While the oxygen atoms can extend from the surface as charged atoms, more typically the oxygen atoms would be neutral, and have another chemical bond extending therefrom in addition to the shown chemical bond to the substrate. Such other chemical bond can extend to, for example, hydrogen, so that the oxygen atoms are in fact part of "OH" (hydroxyl) groups extending upwardly from the surface. Numerous surfaces can have oxygen atoms associated with them, including, for example, glass, aluminum oxide, silicon dioxide, and titanium oxide. Although substrate 50 is shown having a homogenous configuration across its thickness, it is to be understood that the substrate can comprise multiple materials, with only the exposed surface comprising an oxygen-containing material. Also, although the substrate is shown having exposed oxygen atoms along only one of the exposed surfaces (specifically, the top surface 52), it is to be understood that the exposed oxygen atoms can be along multiple surfaces, and in particular aspects can extend around all of the surfaces of substrate 50.

In some aspects, substrate 50 can predominately comprise a mass which does not comprise oxygen, but can still have oxygen associated with an upper surface. An example of such aspects is an embodiment in which substrate 50 comprises a monocrystalline silicon wafer, and in which surface 52 comprises silicon dioxide extending across a surface of the monocrystalline silicon. Another example is an embodiment in which substrate 50 comprises metallic aluminum (or aluminum alloys), and in which surface 52 comprises aluminum oxide. Another example is an embodiment in which substrate 50 comprises metallic titanium (or titanium alloys), and in which surface 52 comprises titanium oxide.

Precursor 60 comprises a core atom of silicon from which a linker 62 extends. Linker 62 can be identical to the linker 14 described with reference to FIG. 1, and accordingly can comprise a hydrocarbon chain. The linker is covalently bonded to the silicon core atom, and also is attached to a functional group 64. Such functional group can be identical to the functional group 16 described with reference to prior art FIG. 1. Functional group 64 can comprise any suitable group for a particular application, with exemplary functional groups being hydrocarbon chains, thiols, amines, carboxylic acids, metallo-organic groups, phosphate groups, aromatic groups, etc.

The silicon core atom is bonded to three groups labeled as "X", "$X_1$" and "$X_2$". Although "X", "$X_1$" and "$X_2$" are referred to as "groups", it is to be understood that "X", "$X_1$" and "$X_2$" can each comprise only a single atom, or can comprise multiple atoms. One or more of the three groups can be a suitable leaving group such that interaction of precursor 60 with an oxygen 54 of substrate 50 forms a covalent bond between the silicon and the oxygen. Accordingly, precursor 60 can be selected from any of numerous classes of materials having silicon bonded to a leaving group, including, for example, siloxanes, silazanes, and chlorosilanes. The silicon together with "X", "$X_1$" and "$X_2$" can be considered to be an attaching group, analogous to the attaching group 12 described with reference to prior art FIG. 1. In particular aspects, all of the groups "X", "$X_1$" and "$X_2$" will be leaving groups, and a thin film of water will be provided over surface 52 prior to interaction of precursor 60 with the surface. The water can displace various of the leaving groups to form crosslinks between adjacent silicon atoms bonded to surface 52, and to thereby crosslink the silicon core atoms of a monolayer formed over surface 52. In aspects in which the groups "X", "$X_1$" and "$X_2$" are utilized to form crosslinks (either by being fully displaced as leaving groups, or by having at least portions of the groups incorporated into the crosslinks),. the groups "X", "$X_1$" and "$X_2$" can be referred to as "crosslinking atoms". Accordingly, precursor 60 can be considered in particular aspects to comprise a core atom silicon from which crosslinking atoms ("X", "$X_1$" and "$X_2$") extend, and also from which functional group 64 extends.

Figure 4:
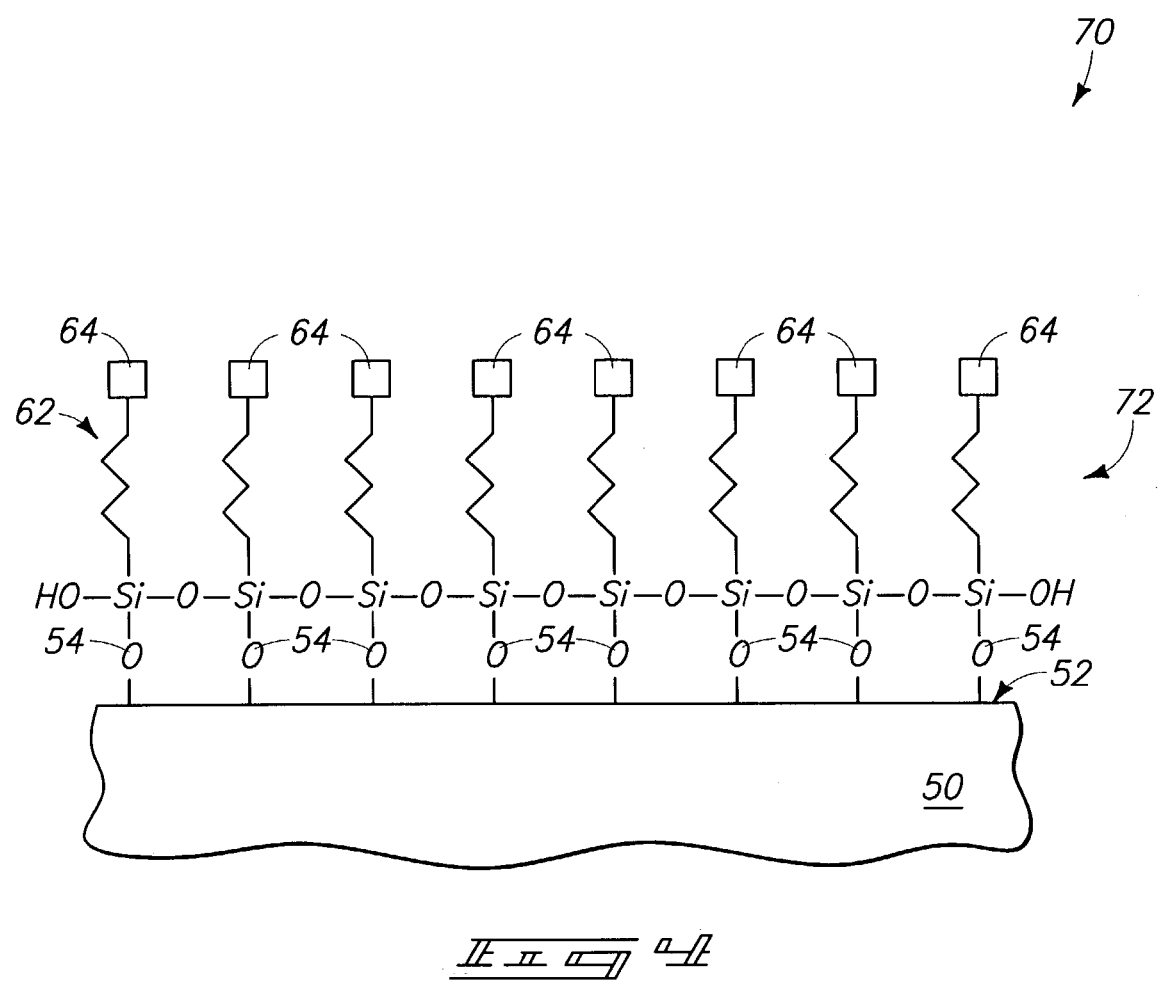
FIG. 4 is a view of the FIG. 3 substrate at a processing step subsequent to that of FIG. 3, with the substrate being shown comprising functionalized silicon chemically bonded to the oxygen atoms associated with the substrate surface.

Referring to FIG. 4, an assembly 70 is shown after precursor 60 (FIG. 3) is reacted with the oxygen atoms 54 associated with surface 52 to form a monolayer 72 extending across the surface. The monolayer is shown to be fully crosslinked, in that all of the silicon core atoms are fully linked with one another. Monolayer 72 can be referred to as a monolayer of functionalized silicon to emphasize that the silicon is bonded to functional groups 64. Although the functional groups 64 are shown to be separate from the linker 62, it is to be understood that in particular applications both the linker and the functional group can be comprised by a single hydrocarbon chain, and accordingly the functional group can be considered to be an extension of the linker.

The attachment of precursor 60 (FIG. 3) to the substrate to form the shown functionalized monolayer preferably occurs under enhanced pressure conditions relative to the prior art. Suitable pressures can be at least 30 psi, at least 100 psi, at least 1,000 psi, at least 4,000 psi, and even at least 8,000 psi under particular conditions. Also, under some conditions the pressure can be within a range of from about 30 psi to about 8,000 psi, and it can be suitable for the range to be from about 1,000 psi to about 8,000 psi, or even from about 4,000 psi to about 8,000 psi.

The reaction of the precursor with the oxygen atoms of the substrate can occur while the precursor is solubolized in an appropriate fluid. The fluid can be in a liquid, gas or supercritical state in various aspects of the present invention. Suitable fluids are discussed below, with an exemplary fluid being $CO_2$.

Although the monolayer is shown formed across an entirety of the surface 52 of substrate 50, it is to be understood that the invention encompasses other aspects in which a monolayer is formed only across a portion of a surface. Such can occur, for example, if only a portion of the surface has the appropriate chemistry to interact with the precursor and form the monolayer.

The time of exposure of substrate 50 to precursor 60 can vary depending on the pressure. In particular applications, a suitable time is at least about 10 seconds, in other applications a suitable time is at least about 30 seconds, in yet other applications a suitable time is at least about 1 minute, and in yet other applications a suitable time is at least about 5 minutes. Typically, a suitable time would be from about 10 seconds to about 5 minutes, with shorter times generally being suitable for higher pressures.

Although substrate 50 is shown having a planar surface, it is to be understood that the substrate can comprise a porous material, such as, for example, a mesoporous material or a zeolite. In such applications, it can be desirable to utilize a sufficiently high pressure so that the precursor suitably penetrates the pores of the porous material. Exemplary processing associated with forming a functionalized precursor within pores of a porous material is described in more detail below.

Although substrate 50 is shown having an oxygen-containing surface, it is to be understood that other substrates can be utilized in methodology of the present invention. For instance, it is found that monolayers of functionalized silicon can be formed across carbon-containing surfaces. In such applications, the precursor 60 can interact with a surface comprising carbon to form a monolayer across such surface. The interaction of material 60 with the surface may be mechanical, as well as, or alternatively, to being chemical. Accordingly, covalent bonds can be formed between the silicon and the carbons atoms of the surface, and/or the attaching group of the monolayer may extend into crevices and cracks associated with the carbon surface to retain the atoms of the monolayer across such surface. Suitable carbon-containing materials include carbon black, carbon fibers, and materials having silicon carbide surfaces. The processing described with reference to FIGS. 3 and 4 for forming a functionalized silicon monolayer across an oxygen-containing surface can be utilized identically for forming a functionalized silicon monolayer across carbon-containing surfaces.

The present invention can enable modification of surfaces for numerous purposes. For instance, the present invention can be utilized to modify a surface to form a functional coating on the surface which is suitable for extracting particular contaminants. In exemplary processing, the coating can comprise sulfur within the functional groups, and such sulfur can be utilized to extract mercury or other heavy metals.

In alternative processing, the methodology of the present invention can be utilized to modify a surface to enhance incorporation of a substrate within a material matrix. For instance, the methodology of the present invention can be utilized for treating surfaces of glass fibers to form a monolayer of organic material chains (such as, for example, hydrocarbon chains) across the surfaces of the glass fibers. Specifically, if the substrate 50 of FIG. 4 is considered to be a glass fiber substrate, and the functional groups 64 are organic materials, the monolayer 72 can be considered to form an organic surface across the glass fiber. The glass fiber can thus be considered to be derivatized to have a organic surface (such as, for example, a hydrocarbon surface). Such derivatized glass fiber can be incorporated into a matrix by bonding the organic group within a polymeric material (such as, for example, an epoxy) to form a fiberglass product. The resulting fiberglass product can have the glass fibers covalently bonded through the organic functional groups to a polymeric matrix, which can be a significant improvement over prior art fiberglass products. Specifically, prior art fiberglass products typically have a mechanical interaction between a polymeric matrix and a glass fiber as the primary interaction retaining the fiber within the polymeric matrix. Mechanical interactions tend to be much weaker than covalent interactions, and accordingly the glass fibers can separate from the polymeric matrix much more easily than would glass fibers covalently bonded to the polymeric matrix in accordance with methodology of the present invention.

In particular aspects of the present invention, an improvement is obtained relative to the prior art whereby a greater portion of assembly atoms are fully cross-linked. The greater portion can be at least about 75%, and is preferably greater than or equal to 80%. In addition, the surface density of the monolayer is greater than is obtained by prior art processes.

The present invention can, in particular aspects, comprise an improvement to the known method for making a self-assembled monolayer on a substrate, the self-assembled monolayer having a plurality of assembly molecules each with an assembly atom with a plurality of bonding sites, the method having the step of bonding a plurality of oxygen atoms to a fraction of the plurality of bonding sites; wherein the improvement is the bonding done by preparing the self-assembled monolayer under high pressure, and in particular aspects in a supercritical fluid.

If a supercritical fluid is utilized, it can be polar or non-polar. Compounds useful in the supercritical phase for particular aspects of the present invention can include, for example, carbon dioxide, and possibly freons, nitrogen, noble gases, alkanes, alkenes, alkynes, and combinations thereof.

Thermal curing of the self-assembled monolayer can be conducted during or after forming of the self-assembled monolayer. In other words, a self-assembled monolayer that has been prepared under a suitable pressure (and possibly in a supercritical fluid) exhibiting a portion of assembly atoms fully crosslinked to oxygen atoms and a maximum surface density of assembly atoms may be exposed to the pressure for a time that is effective in converting interfering hydroxyl groups to bridging oxygen bonds, thereby increasing the number of fully crosslinked silicon atoms to a greater portion. Alternatively, a self-assembled monolayer may be treated by adding assembly molecules to the gaps of the alternatively prepared monolayer. The assembly molecules can be, in particular aspects, added in a supercritical fluid.

The assembly atoms can be selected to be compatible with the substrate. For attaching to silica, the assembly atoms can include a silicon atom with four attachment sites, for example siloxane, silazane, and chlorosilane. Alternative assembly molecules include metal phosphate, hydroxamic acid, carboxylate, thiol, amine and combinations thereof for attaching to a metal oxide; thiol, amine, and combinations thereof for attaching to a metal; and chlorosilane for attaching to a polymer. A carbon chain spacer or linker can extend from the assembly atom and can have a functional group attached to the end opposite the assembly atom, as discussed previously in this disclosure.

For silicon atoms (having four bonding sites), the portion of fully crosslinked bonding sites by high pressure exposure (which can, in particular aspects of the invention, include supercritical fluid chemistries) can be greater than or equal to about 40% as deposited. Additional exposure time can increase the fully crosslinked fraction to at least about 55%. Table 1 shows the amount of time for the percent of fully crosslinked siloxanes for supercritical fluid processing at 7500 psi and 150° C. The times and percent of full crosslinking are pressure and temperature dependent.

TABLE 1

Supercritical $CO_2$ Exposure Time for Percent of Fully Crosslinked Siloxanes

| Time (hours) | % of Fully Crosslinked Siloxanes |
| --- | --- |
| ≦1/12 | >40 |
| 4 | >55 |
| 24 | >75 |

High pressure deposition in accordance with methodology of the present invention can result in greater surface density of the assembly molecules relative to prior art methods. For siloxane, the surface density is greater than 5.2 siloxane molecules per square nanometer, and has been demonstrated up to 6.5 siloxane molecules per square nanometer when processing comprises a pressure of at least about 7500 psi.

The surface deposition of the self-assembling monolayer(s) can be done, for example, by placing one or more self-assembling monolayer precursor(s), including but not limited to alkoxysilane, silazane, chlorosilane, and combinations thereof, together with mesoporous material that may be ceramic, for example metal oxide, including but not limited to silica, alumina, titania, and combinations thereof, in a vessel that is subsequently filled with a high pressure fluid (in particular aspects a supercritical fluid), including but not limited to carbon dioxide ($CO_2$), ethane ($C_2H_6$), ammonia ($NH_3$), and combinations thereof, to obtain the self-assembling monolayer(s) on the mesoporous or zeolite material. By using a high pressure for deposition of the self-assembling monolayer (with or without supercritical fluid chemistry), the surface density of silanes may be greater than 5.2 silanes per square nanometer. The surface density can be controlled by the amount of assembly molecule (e.g. silane) used for a given surface area of mesoporous material. Moreover, deposition is complete in about 5 minutes and no subsequent drying is needed. With a 5-minute deposition, the percent of fully crosslinked silicon atoms can be about 40%. Additional exposure to a suitable high pressure can increase the percentage of fully crosslinked silicon atoms (see Table 1 above).

The calcined mesoporous material can be provided by mixing a sol-gel solution and surfactant for producing a mesoporous green body; removing the surfactant with a high pressure fluid (in some applications, a supercritical fluid) and making a dry green body; and calcining said dry green body into the desired mesoporous material. In this manner, the entire process from sol-gel templating through self-assembling monolayer deposition to increasing the fraction of fully bonded silicon atoms may be done in a single vessel environment. In some applications the entire process can be done under a suitable high pressure, and in particular applications the entire process can be conducted while a supercritical fluid is within the vessel.

EXAMPLE 1

An experiment was conducted to test the influence of supercritical carbon dioxide ($SCCO_2$) on the hydration of a mesoporous silica designated MCM-41, obtained by making the MCM-41 according to U.S. Pat. No. 5,264,203 (Mobil Oil Corporation, Fairfax, Va.). The calcined substrate (primarily Q4 [non-hydroxylated silanol]) was free of any silane(s).

Water was introduced to the pores of the MCM-41 sample via passive hydration in a 100% humidity chamber, followed by subjecting the hydrated sample to $SCCO_2$ forced hydrolysis at 100° C. This hydration protocol involved neutral pH, no salt, no ceramic oxide or organic contaminants; just water, carbon dioxide and heat.

NMR analysis showed that this hydrolysis treatment was found to increase the bonding fraction (hydroxylated silicon atoms) to 46% Q3 (surface silanol) and 8% Q2 (geminal silanol). This hydrolysis was carried out in the presence of excess water and hydrolysis stopped at this point, with no damage to the mesostructure. The mild conditions of this hydrolysis prevent the dissolution of the MCM-41 since silicic acid is insoluble in $SCCO_2$, and thus there was very little risk of collapsing the mesostructure. ($SCCO_2$ is very nonpolar, and approximates hexane in its solvating power).

Figure 5:
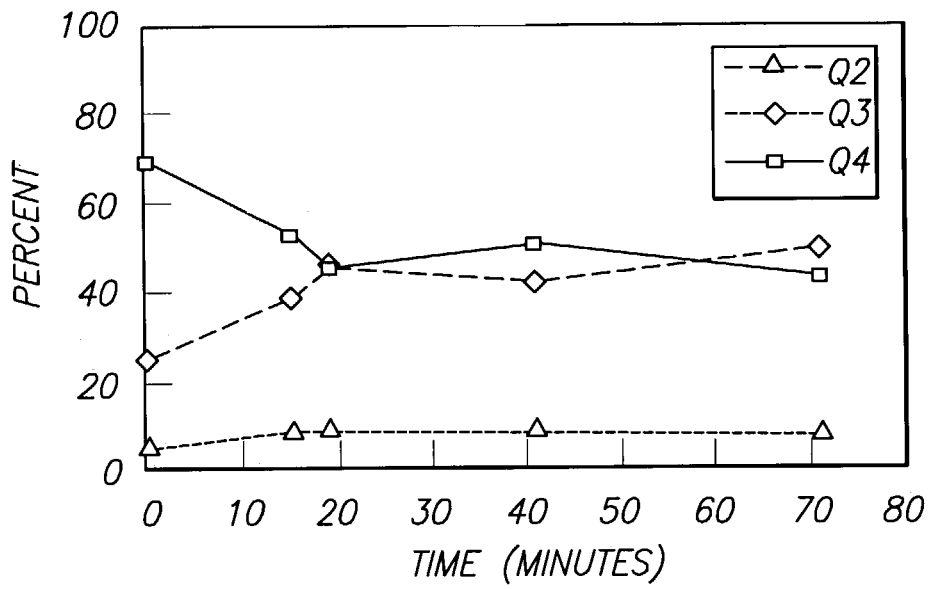
FIG. 5 is a graph of percent composition versus time for hydroxylated silanol.

The hydrolysis reaction was complete in about 20 minutes (See FIG. 5).

A comparison was made to a hydration or hydrolysis done by placing a second sample of MCM-41 in water and boiling at atmospheric pressure for four hours. In this comparison, no change or difference was observed.

EXAMPLE 2

An experiment was conducted to compare the surface density of assembly molecules using prior art deposition conditions as reported by Feng et al., 1997 and Liu et al, 1998 (described in Background above), and using enhanced pressure conditions of the present invention. The particular methodology utilized a supercritical fluid state while utilizing the enhanced pressure.

Surface density was determined gravimetrically and by $^{29}Si$ NMR.

The prior art deposition methods included an azeotropic distillation. The surface density of the product made with the prior art deposition methods was 5.0-5.2 silanes/nm$^2$.

According to an aspect of the present invention, the silica was hydrated by simply storing it in a 100% humidity chamber and monitoring the sample's weight as a function of time, stopping at 20-25% weight gain. The MCM-41 was added to the sample holder along with the MPTMS (mercaptopropyl trimethoxysilane), then the system was sealed and brought up to pressure and temperature (7500 psi and 150° C.) with $SCCO_2$. After only 5 minutes, a monolayer with a surface density of 6.4 silanes/nm$^2$ was deposited which was surprisingly approximately 20% higher than achieved using the prior art deposition conditions.

Figure 6A:
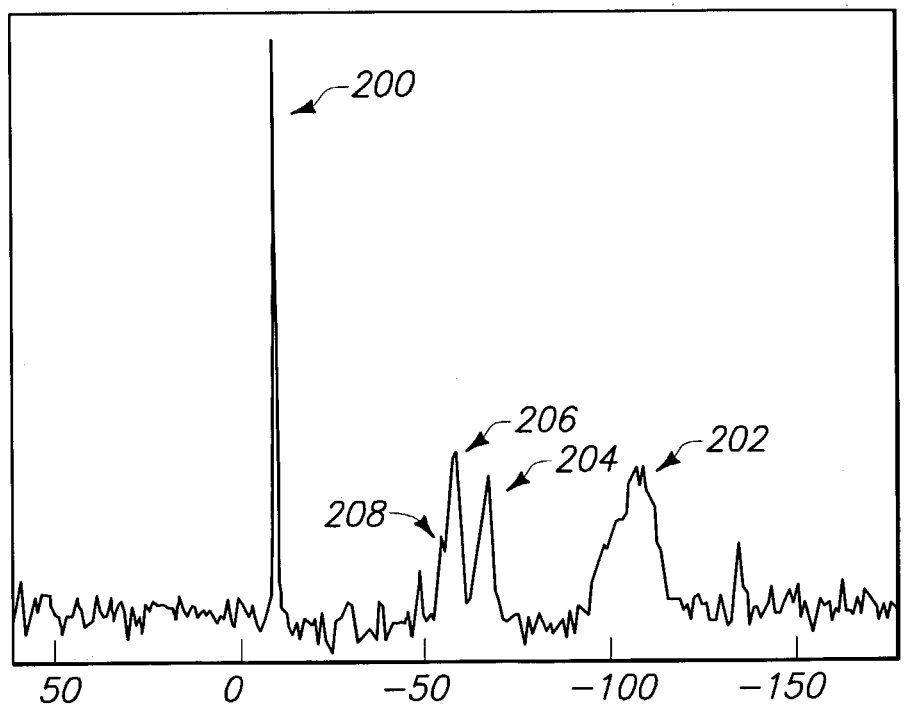
FIG. 6a is an NMR spectrum of a 5-minute sample made according to an aspect of the present invention.

The spectrum of this 5-minute sample is shown in FIG. 6a. A reference peak 200 is from TTMS tetrakis (trimethylsilyl) silane. The peak 202 is a combination of signals for Q2, Q3, and Q4 silicic acid units in the base material. The peaks 204, 206, 208 are the internal, terminal, and isolated silanes respectively. The silane demographics of this sample are similar to those found in monolayers prepared under atmospheric pressure and liquid solution phase conditions.

Figure 6B:
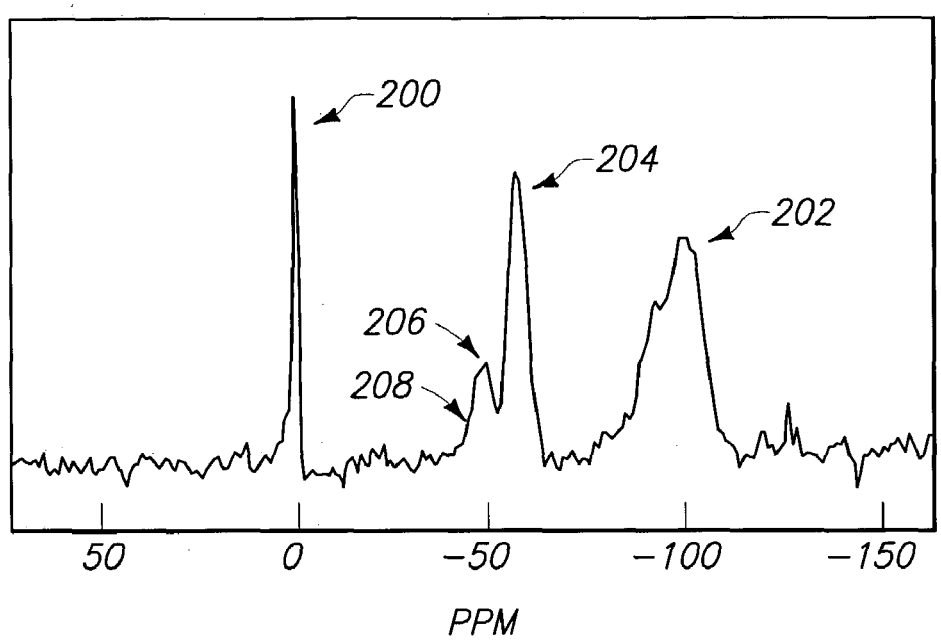
FIG. 6b is an NMR spectrum of a 24-hour sample made according to an aspect of the present invention.
Figure 6C:
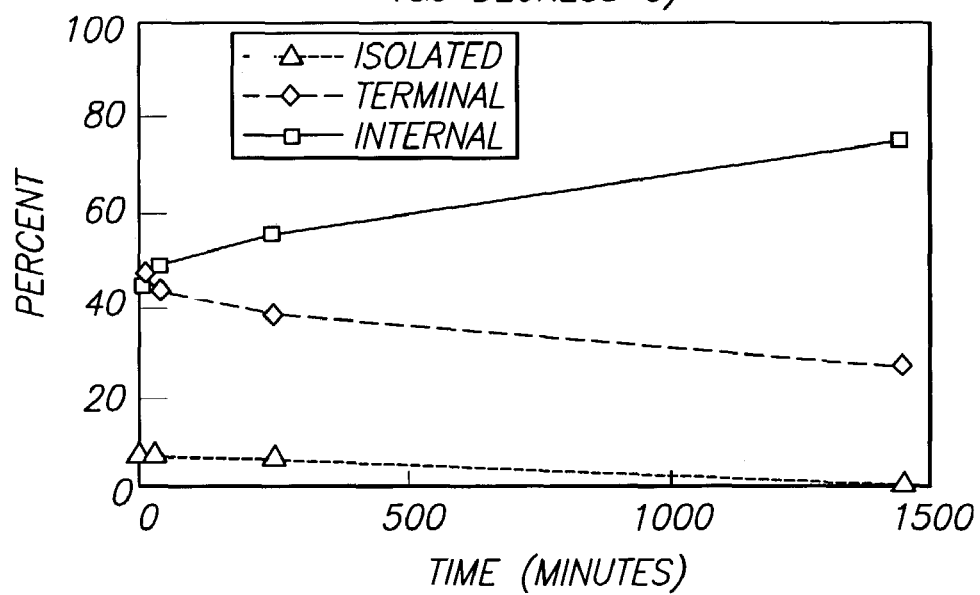
FIG. 6c is a peak ratio (percent) versus time for various samples.

It was also found that maintaining the sample at elevated temperature and pressure in $SCCO_2$ resulted in a slow but steady evolution of the silane demographics, with a gradual decrease in the population of the terminal silane with a concomitant increase in the population of the internal silane over 24 hours. Over this same timeframe, the signal for the isolated silane completely disappeared, indicating an annealing of the "dangling" hydroxyls within the monolayer, resulting in a greater fully bonded fraction or higher degree of siloxane crosslinking. In this experiment, a terminal to internal silane ratio (based upon total area under each peak) of approximately 1:4 after 24 hours was observed (FIG. 6b). This is unexpectedly the highest degree of crosslinking in a silane based monolayer documented by $^{29}Si$ NMR. Ratios as a function of time are summarized in FIG. 6c showing evolution of silane demographics.

The high pressure of the reaction medium contributes to both the surprising surface density and the unexpected high degree of crosslinking.

EXAMPLE 3

An experiment was conducted as in Example 2 wherein a portion of the material from the 5-minute sample was re-exposed or re-introduced to the high pressure supercritical fluid environment for an additional 30 minutes.

Figure 7:
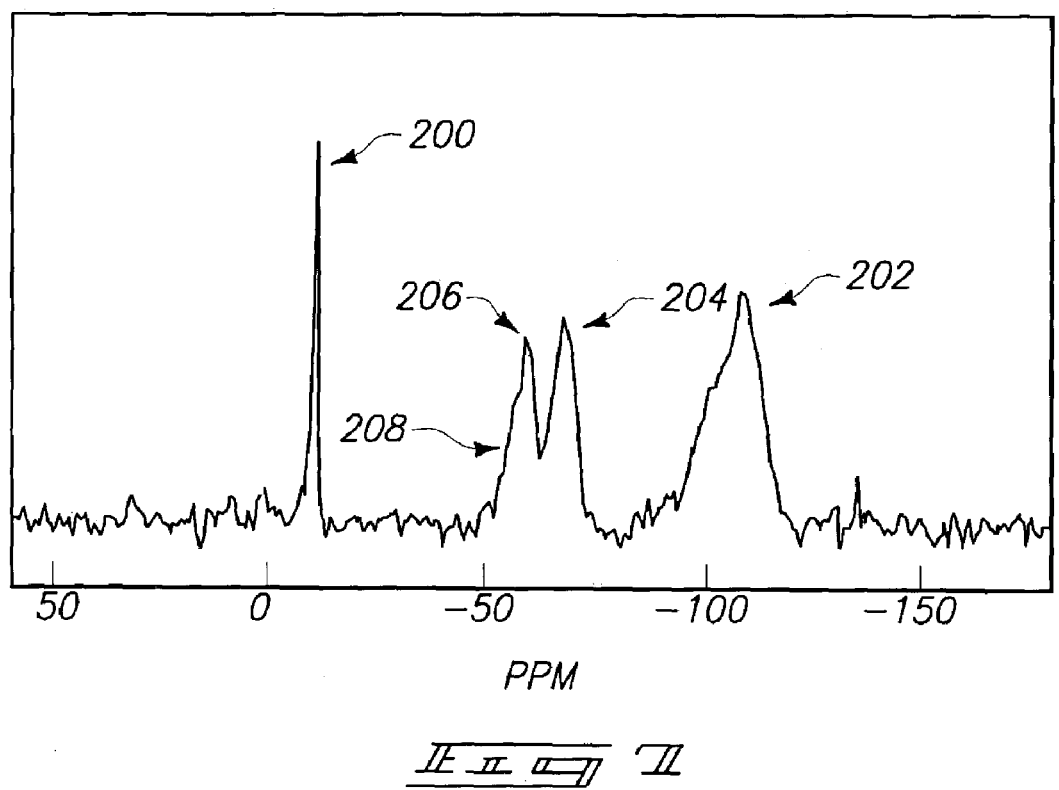
FIG. 7 is an NMR spectrum of a 5-minute sample re-annealed for 30 minutes.

Results are shown in FIG. 7. The evolution or formation of the monolayer continued in the same manner as for continuous high pressure supercritical fluid exposure.

EXAMPLE 4

An experiment was conducted to demonstrate the enhanced chemical stability of the coating material as produced as in Example 2. Samples of the coating material of the present invention from Example 2 were exposed to a series of buffer solutions of various pHs. Comparative samples of coating material formed by prior art methodologies were exposed to identical buffer solutions as the samples of the present invention, at various pHs from 0.5 to 12.5.

Figure 8:
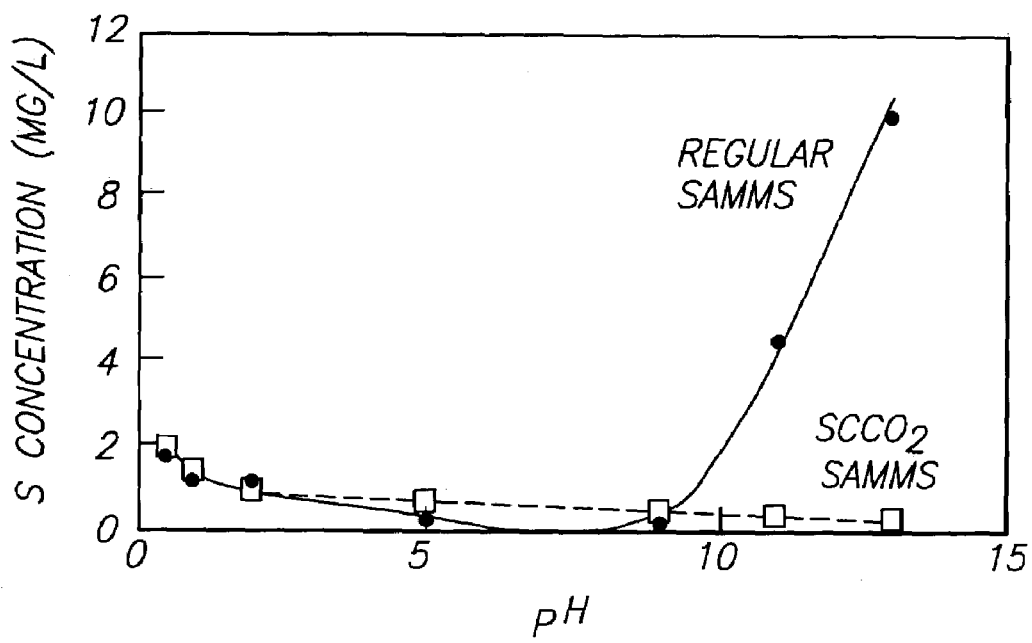
FIG. 8 is a graph of sulfur concentration versus pH for samples made according to an aspect of the present invention and exposed to corrosive solutions, and compared to samples made by prior art methodologies.

Results are shown in FIG. 8 wherein essentially no difference is observed for pH less than 9, but above pH 9 up to pH 12.5, the prior art deposited material (Regular SAMMS) exhibits a leaching or loss of sulfur to the solution indicating a degradation of the monolayer. The high pressure supercritical deposited material according to the present invention shows no change in sulfur concentration above pH 9 up to pH 12.5. This increase in chemical durability of the monolayer is an unexpected result.

EXAMPLE 5

An experiment was conducted as in Example 2 wherein Zeolite beta from (Zeolyst) in the form of beads (3 mm in diameter) was mixed with tris(methoxy)mercaptopropylsilane (TMMPS) with a zeolite to TMMPS weight ratio of 0.67 and loaded into the sample container in the high pressure reaction vessel. The system was sealed. The pressure and the temperature were increased to 7500 psi and 150° C. using $CO_2$. The zeolite was treated under these conditions for 12 hours before the pressure was reduced and temperature decreased to 25° C. The treated zeolite beads were recovered after the treatment, and ground into powders for further treatment.

Functionalized and unfunctionalized zeolites were characterized by X-ray diffraction (XRD). The XRD peaks recorded are consistent with the XRD data reported for zeolite beta, but the diffraction peaks are broader and weaker. Apart from the two main peaks at 2 theta of 7.7° and 22.5°, other minor diffraction peaks are not well resolved. The XRD data suggest that the commercial zeolite beta used here has a similar crystalline structure as the synthetic high purity zeolite beta, but has smaller crystallite size, or a higher degree of disordering. Transmission electron microscopy (TEM) images and electron energy dispersive X-ray spectroscopy (EDX) spectra were also obtained. Because the commercial zeolite beta is not highly crystalline, the zeolite lattice fringes are not resolved in the TEM image. In the EDX spectrum, a strong Si peak, a small Al peak (from the zeolite material), and a small S peak is observed. This S peak comes from the sulfonate group introduced into the zeolites during $SCCO_2$ functionalization. From the EDX data the sulfonate group density in zeolite can be estimated to be 0.87 mmol sulfonate/g zeolite. The aluminum concentration is about 2% by weight.

Typically part of the unreacted silanes and by-products would be forced out of the inner volume of the porous substrate when the pressure was quickly reduced from the high pressure treatment. After the high pressure treatment, the materials were further treated with $H_2O_2$/method solutions and $H_2SO_4$ solutions over long periods of time during the acidifying and sulfonation procedure, which also includes many washing and rinsing steps involving ethanol and water. It is expected that any physically trapped silanes or its by-products should be removed from the material during these treatments. This conclusion is verified by acid washing experiments. No silane product was released, as measured by NMR experiment, when the sulfonated zeolite was subject to extended wash in 0.1 M acid solutions.

A Chemagnetics NMR spectrometer was used to obtain $^{29}Si$ NMR results. It is noted that relative peak intensities in $^{29}Si$ CP-MAS are not strictly quantifiable due to differences in relaxation behavior. Therefore, we have used the Bloch decay pulse sequence (single pulse excitation) with long recycle times (30 sec) to obtain the spectrum more representative of the molecular composition of these materials. The large peak at −110 ppm is from the silica support. The broad feature at −110 ppm is also indicative of the poor crystalline nature of the zeolite. Two additional peaks from −50 to −80 ppm corresponding to siloxane groups in the functionalized zeolites are observed. The siloxanes peaks are much more pronounced than reported in literature, suggesting a higher surface coverage. The peak positions suggest a high degree of crosslinking between the siloxane groups, and between siloxane groups and the substrate. Since the small pore size excludes the possibility of close packing of the silane groups, the siloxanes are most likely attached to the substrate with a tridentate and/or bidentate binding. On smooth substrates or in large pore materials, both tridentate and bidentate bindings are not favored. This binding scheme has been reported in zeolites because of the small pore size and high curvature.

The conversion of cyclohexanone (HEX) and pyrene carboxaldehyde (PYC) can be easily quantified and the only observed products were the mixtures of reactants and acetalized (or ketalized) products. For sulfonated zeolite (Z-SO3H), more than 60% HEX was converted in 4 hours, and nearly complete conversion was observed over 12 hours. On the other hand, PYC, which has a large molecular size and cannot enter the microporosity, showed less than 8% conversion over extended reaction time with same $Z-SO_3H$ as catalyst. These results indicate that the $Z-SO_3H$ material is size selective, and that the majority of $SO_3H$ groups are inside the microporosity and are accessible to molecules smaller than the pore size, and inaccessible to the molecules larger than the pore size. The reaction rate with $SCCO_2$ $Z-SO_3H$ compares favorably with similar zeolite functionalized using an in-situ deposition technique, which produced 38% conversion of HEX in 4 hours under the same conditions. Both HEX and PYC were also reacted over pure zeolite beta (Z), and the TMMPS functionalized zeolite (Z-SH) before it was treated with $H_2O_2$. Pure zeolite and Z-SH showed low catalytic activity, and only a small fraction of either HEX and PYC was converted. It can be concluded from these results that the majority of $SO_3H$ groups reside inside the zeolite pore channels and act as the active center for the reaction. It is important to note that no additional extraction procedure was performed on the high pressure processed zeolite to remove chemically bonded sulfonated groups on the external surface of the zeolite. Therefore a small portion of chemically bonded sulfonated groups remained on the external surface, which gave rise to the residual activity observed for PYC. However, the contribution of the external sulfonic groups to the overall reaction is minimal. Furthermore, the activity of the external acid groups can be selectively neutralized to achieve complete size selectivity (which has been demonstrated in our experiments). The external acid groups can be also removed through a post extraction treatment.

The high activity of the functionalized zeolite over the parent material is attributed to the acidic groups introduced by the functional groups. To verify this, acid-base titration was conducted to determine the number of acid sites. The titration was conducted in 5.0 ml 0.1 N HCl solution with 0.05 g suspended solid powders using a 0.1 N NaOH solution as the titrant. The titration curve is the superposition of the titration curve of the strong acid (HCl) and that of the surface acid group from the catalyst. The proton capacity (acid site density) can be calculated using standard methods. The titration experiments showed that the sulfonated zeolites ($Z-SO_3H$) have a much high proton capacity (25.7 mmol/g) as compare with the native zeolite beta (3.79 mmol/g) and the unsulfonated thiol zeolite (Z-SH) (3.37 mmol/g).

For comparison, sulfonated mesoporous silica ($M-SO_3H$) was used to catalyze the conversion of PYC and HEX. In this case both HEX and PYC can easily enter the pore channel and access the catalytic $SO_3H$ sites. Therefore low-selective conversion of both HEX and PYC were observed.

Further evidence of the size selectivity is provided when amines of different sizes are used to poison (neutralize) the acid sites. Reaction of HEX and glycol was performed over $Z-SO_3H$ as discussed before. Triethylamine (($C_2H_5)_3N$, or TEA) is added to the reaction bath after 40 minutes. TEA is a small molecule and can enter the microporosity and poison all the acid sites. The addition of TEA completely stopped the reaction. Under the same condition the addition of methyldioctylamine [$(CH_3(CH_2)_7)_2NCH_3$, or MDOA] instead of TEA did not have any effect on the conversion of HEX over $Z-SO_3H$, because the molecular size of MDOA is too large for it to enter the microporosity and poison the acid sites in the internal pore channels. The addition of MDOA did effectively neutralize all the residual acid sites on the external surfaces of $Z-SO_3H$. Zero activity was observed for PYC under these conditions. If the pore size is large enough, like in mesoporous silica ($M-SO_3H$), MDOA is an effective poison for acid catalyzed reaction. We have shown that the addition of MDOA to the reaction bath of HEX over $M-SO_3H$ completely stopped the reaction in the mesoporous materials.

EXAMPLE 6

This experiment demonstrates self-assembly of silane molecules under high pressure onto moderately hydrated Greige fiberglass surfaces. The pressure is preferably greater than the corresponding saturation pressure for deposition of the self-assembled monolayer. The silane utilized in the experiment was trifluoroethylester of undecylenic trimethoxysilane, and the silane was dissolved in supercritical $CO_2$ for the reaction of this particular example. The siloxane head group (Si) $OCH_3)_3$ condenses with silanol groups on the glass fiber surface (Si—OH), forming a Si—O—Si bond between the fiberglass and silane, with the byproduct being methanol ($CH_3OH$) and two unreacted $Si-OCH_3$ bonds. The reaction is completed by crosslinking between the remaining silanes ($SiOCH_3$) bonds to form the Si—O—Si network on top of the original glass fiber surface. It is this crosslinking that increases the chemical stability of the self-assembled monolayer.

A glass fiber sample (1.0 gram) was washed in isopropanol (100 mL) using ultrasonication for 15 minutes. The sample was removed and dried in a continuous stream of nitrogen for 24 hours. A portion of the sample (0.591 gram) was then placed in a container and hydrated in a stream of water-saturated nitrogen for 1 hour. Extraneous water was removed under a dry nitrogen stream.

The hydrated portion of the sample was removed and placed in a supercritical fluid tube along with 0.25 mL of TFEE (trifluoroethylester of undecylenic trimethoxysilane) and secured for self assembling monolayer (SAM) deposition. An ISCO Series D Pump Controller and Model 100 DM Syringe Pump was used. The supercritical fluid utilized for the deposition was carbon dioxide ($CO_2$). The reaction conditions included a temperature of 150° C., a pressure of 4500 psi, and a reaction time of 15 minutes. The system was subsequently vented and copious $CO_2$ was used to wash and dry the treated portion of the sample. The treated portion of the sample was then reweighed (0.794 gram) to determine the extent of mass increase (0.203 gram) due to covalent attachment of the silane. Such corresponds to about a 34% mass increase. X-ray photoelectron spectroscopy (XPS) data shows that there is a monolayer of TFEE molecules on the surface, with the modified fiberglass being found to have the following properties.

|  | Element | | |
|---|---|---|---|
|  | C | Si | F |
| TFEE Fiberglass | 66.0 | 7.7 | 1.9 |

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A method of forming a monolayer of functionalized silicon on a substrate surface, the functionalized silicon including an organic group covalently attached with the silicon, the method comprising exposing the substrate surface to a precursor comprising the functionalized silicon, the precursor interacting with the substrate to form the monolayer across at least a portion of the surface of the substrate; and wherein the exposing of the substrate surface to the precursor occurs in a supercritical fluid comprising one or more members of the group consisting of ammonia, freons, nitrogen, and noble gases, wherein the substrate comprises a glass fiber; and further comprising, after forming the monolayer, incorporating the glass fiber into a fiberglass matrix by bonding the organic group within a polymeric material.

2. The method of claim 1 further comprising forming a film of water across a surface of the substrate prior to the exposing of the substrate to the precursor.

3. The method of claim 1 wherein the precursor is selected from the group consisting of siloxanes, silazanes and chlorosilanes.

4. A method of functionalizing an oxygen-containing surface, comprising exposing the surface to precursor molecules, the precursor molecules comprising core atoms from which crosslinking atoms and functional groups extend; the precursor molecules interacting with the oxygen of the oxygen-containing surface to form a monolayer across at least a portion of the surface, the monolayer layer comprising the functional groups; and wherein the exposing of the oxygen-containing surface to the precursor molecules occurs in a supercritical fluid comprising ammonia, wherein the surface is a surface of a glass fiber; and further comprising, after forming the monolayer, incorporating the glass fiber into a fiberglass matrix by bonding the monolayer within a polymeric material.

5. The method of claim 4 wherein the core atoms are silicon.

6. The method of claim 5 wherein the precursor molecules are selected from the group consisting of siloxanes, silazanes and chlorosilanes.

* * * * *

UNITED STATES PATENT AND TRADEMARK OFFICE
CERTIFICATE OF CORRECTION

PATENT NO. : 7,629,028 B2  Page 1 of 1
APPLICATION NO. : 10/607870
DATED : December 8, 2009
INVENTOR(S) : Alford et al.

It is certified that error appears in the above-identified patent and that said Letters Patent is hereby corrected as shown below:

Col. 4, Line 10 – Replace "(or fraction)" – with --(or fractions)--.

Col. 15, Line 3 – Replace "HCI" – with --HCl--.

Col. 15, Line 6 – Replace "HCI" – with --HCl--.

Col. 15, Line 49 –Replace "OCH$_3$)$_3$" – with --(OCH$_3$)$_3$--.

Signed and Sealed this

Third Day of August, 2010

David J. Kappos
*Director of the United States Patent and Trademark Office*

UNITED STATES PATENT AND TRADEMARK OFFICE
CERTIFICATE OF CORRECTION

PATENT NO. : 7,629,028 B2 Page 1 of 1
APPLICATION NO. : 10/607870
DATED : December 8, 2009
INVENTOR(S) : Alford et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1158 days.

Signed and Sealed this

Second Day of November, 2010

David J. Kappos
*Director of the United States Patent and Trademark Office*